United States Patent [19]
Allegranza et al.

[11] Patent Number: 5,625,685
[45] Date of Patent: Apr. 29, 1997

[54] NETWORK TERMINATION UNIT

[75] Inventors: Patrick Allegranza, Zurich; Stephan Burgin, Rheinau; Peter Kopp, Widen, all of Switzerland

[73] Assignee: Siemens Schweiz AG, Zurich, Switzerland

[21] Appl. No.: 378,275

[22] Filed: Jan. 26, 1995

[30] Foreign Application Priority Data

Jan. 27, 1994 [CH] Switzerland .................. 247/94

[51] Int. Cl.$^6$ .................. H04M 3/00; H04J 3/12
[52] U.S. Cl. .................. 379/399; 379/88; 379/93; 370/385
[58] Field of Search ................ 379/399, 88, 93, 379/201, 413; 370/58.1, 60, 58.2, 68.1, 67, 110.1

[56] References Cited

U.S. PATENT DOCUMENTS

| 5,305,312 | 4/1994 | Fornek et al. .................. 379/93 |
| 5,305,315 | 4/1994 | Lee .................. 370/84 |

FOREIGN PATENT DOCUMENTS 0495423  7/1992  European Pat. Off. .

OTHER PUBLICATIONS

"ISDN Das Dienstintegrierende Digitale Nachrichtennetzwerk" [ISDN—The Intergrated Services Digital Communications Network] by P. Bocker, published by Springer Verlag in Berlin, 1990, p. 29.

Kommunikation Mit ISDN [Communications Using the ISDN] by Dr. H. E. Martin, published by Markt and Technik Verlag, Munich, 1988.

Bauteile—Technologie im System ALBIS-ECS 10 000 [Component Technology in the ALBIS-ECS 10 000 System] by Samuel Hammerli, pp. 25–29, and figures 2 and 3.

ISDN—Die Technik [ISDN—The Technology] by A. Kanbach and A. Körper, published by Hüther Verlag Heidelberg, 1990, pp. 73–75, 104–109, 206–266, 271.

Digitale Kommunikationsnetze by G. Gerke, published by Springer Verlag in Heidelberg, 1991.

Kommunikationsendgerate by F. Ohmann, published by Springer Verlag in Heidelberg, 1983, pp. 176, 177 and 205–207.

*Primary Examiner*—Krista M. Zele
*Assistant Examiner*—Jacques M. Saint-Surin
*Attorney, Agent, or Firm*—Greenblum & Bernstein, P.L.C.

[57] ABSTRACT

A network termination unit to connect a plurality of analog terminals and digital terminals to a U interface of an ISDN telecommunications network. An echo compensator is connected to the U interface to suppress an echo signal produced by the attachment of the terminal device to the U interface. A first bus connects the echo compensator to a communication controller, an a/b interface component block that is compatible with an a/b interface to which an analog terminal is connected, and an S interface component block to which a digital terminal is connected. A processor system, connected to communication controller and a/b interface component block, programs the echo compensator and the S interface component block. B channels of the ISDN telecommunications network are activated and deactivated in response to commands issued by the communication controller. The processor system further evaluates and prepares D channel signalling data for the a/b interface component block.

26 Claims, 2 Drawing Sheets

NETWORK TERMINATION UNIT

BACKGROUND OF THE INVENTION

1. Field of the Invention

The present invention is directed to a network termination unit for connecting analog and/or digital terminal devices to a interface of an ISDN telecommunications network.

2. Discussion of Background and Relevant Information

It is anticipated that only digital subscriber terminal devices (Integrated Services Digital Network terminals, commonly referred to as ISDN terminals) will be used when the final implantation of ISDN telephone exchange networks, as described, for example, in "ISDN Das Dienstintegrierende Digitale Nachrichtennetzwerk" [ISDN—The Integrated Services Digital Communications Network] by P. Bocker, published by Springer Verlag in Berlin, 1990, is achieved. However, for the immediate future, telecommunication networks employ both conventional (i.e., analog) terminal devices and ISDN (digital) terminals.

Conventional terminal devices are connected to an S interface of the ISDN, in accordance with the ISDN specification, via an a/b interface (see, for example, page 102 of Kommunikation Mit ISDN [Communications Using the ISDN] by Dr. H. E. Martin, published by Markt & Technik Verlag, Munich, 1988, or page 29 of "ISDN Das Dienstintegrierende Digitale Nachrichtennetzwerk" [ISDN—The Integrated Services Digital Communications Network] by P. Bocker, published by Springer Verlag in Berlin, 1990). An ISDN network terminator (NT12, NT1 or NT2) must be provided between a two-wire subscriber line, connected to the central exchange, or between a U interface and the S interface. This results in a complicated setup in order to connect conventional (analog) terminal devices to the ISDN.

Three types of network terminators exist; NT1, NT2 and NT1, 2 network terminators. Network terminator i (NT1) includes functions that may be regarded as belonging to OSI (Open Systems Interconnection) layer 1; that is, functions associated with the physical and electrical termination of the ISDN on the user's premises. The network terminator 1 (NT1) may be controlled by the ISDN provider and forms a boundary to the network. This boundary isolates the user from the transmission technology of the subscriber loop and presents a new physical connector interface for user device attachment. In addition, the network terminator 1 (NT1) performs line maintenance functions, such as, for example, loop-back testing and performance monitoring.

Network terminator 2 (NT2) is an intelligent device that may include, depending on the requirement, up through OSI layer 3 functionality. Network terminator 2 (NT2) can perform switching and concentration functions.

Network terminator 1, 2 (NT12) is a single device that contains the combined functions of the network terminator 1 (NT1) and the network terminator 2 (NT2).

European Patent Application EP 0 495 423 discloses a connection device, in which two analog terminals can be economically connected to the U interface of the ISDN telecommunications network. However, an ISDN network termination unit is still required that is connected to the U interface and that has the S interface with which the digital terminals can be connected directly, and in which the analog terminals can be connected via a terminal adapter (TA) if a subscriber wishes to connect both analog and digital terminals, as shown at page 29 and FIG. 2.7 in "ISDN Das Dienstintegrierende Digitale Nachrichtennetzwerk" [ISDN—The Integrated Services Digital Communications Network] by P. Bocker, published by Springer Verlag in Berlin, 1990.

SUMMARY OF THE INVENTION

Accordingly, it is an object of the present invention to create a network termination unit for economically connecting analog terminals and digital terminals to a U interface. Thus, the network termination unit may provide access for conventional (non-ISDN) analog terminals and digital ISDN terminals to an ISDN digital subscriber line.

According to an object of the instant invention, a network termination unit for connecting a terminal device, such as an analog terminal or a digital terminal, to a U interface of an ISDN telecommunications network is disclosed that comprises a processor system, an echo compensator that is connected to the U interface of the ISDN telecommunications network to cancel an echo signal, a communication controller, an a/b interface component block that is connected to an a/b interface of the ISDN telecommunications network, an S interface component block that is connected to an S interface of the ISDN telecommunications network, and a first bus that inter-connects the echo compensator, the communication controller, the a/b interface component block, and the S interface component block. The processor system has access to the first bus via a second bus that inter-connects the processor system, the communications network and the a/b interface component block. The a/b interface component block comprises a subscriber line interface and a converter component block. The processor system programs at least one of the S interface component block or the converter component block.

An advantage of the present invention resides in that a B (base) channel of the ISDN telecommunications network is controlled by the a/b interface component block. The processor system evaluates and prepares D (data) channel signalling data for the a/b interface component block.

According to another advantage of the instant invention, the processor system transmits the signaling data to the D channel of the ISDN telecommunications network.

A feature of the instant invention is that the communication controller is controlled by the processor system to output predetermined digitalized tones, via the first bus, to the a/b interface component block. The predetermined digitized tones comprise, for example, a first digitized tone representing an "all trunks busy" tone, and a second digitized tone representing a ringing tone.

According to the preferred embodiment of the present invention, the a/b interface component block comprises a metering pulse generator that is controlled by the processor system, in which a reference frequency signal is inputted to the metering pulse generator and divided in accordance with a program instruction from the processor system, so as to produce a desired frequency signal that is outputted to the subscriber line interface in response to a command from the processor system.

The preferred embodiment of the present invention includes a ring signal generator that is controlled by the processor system. A predetermined line connects the ring signal generator to the subscriber line interface of the a/b interface component blocks. One signal at a time is outputted by the ring signal generator on the predetermined line.

Another feature of the preferred embodiment of the instant invention is that the processor system is connected to the subscriber line interface via a second predetermined line, and transmits a switch hook detection signal, that is generated by the subscriber line interface, to the processor system.

The processor system of the preferred embodiment comprises a processor, a memory component block, and a mode switch unit. An internal processor system bus is provided to inter-connect the processor to the memory component block and the mode switch unit.

An advantage of the present invention is that the processor outputs a power control signal to at least one of the a/b interface component block, the ring signal generator, and the S interface component block.

Another advantage of the present invention resides in the communication controller and the S interface component block being programmed so that the communication controller outputs signals to the D channel of the ISDN telecommunications network only when an authorization request from the communication controller is affirmatively answered by the S interface component block.

According to another object of the present invention, a network termination unit is disclosed for connecting at least one analog (or digital) terminal device to a U interface of an ISDN telecommunications network. The network termination unit comprises a processor system, means for compensating for an echo signal at the U interface of the ISDN telecommunications network, an a/b interface component block for connecting an analog terminal device to the ISDN telecommunications network, an S interface component block for connecting a digital terminal device to the ISDN telecommunications network, means for exchanging data between the compensating means, the a/b interface component block, and the S interface component block, and means for exchanging operating instructions between the processor system and the a/b interface component block.

According to a feature of the disclosed preferred embodiment, the processor system comprises a processor, an oscillator that supplies a reference frequency clock signal to the processor, a memory component block that stores operating parameters, a mode switch unit that sets an operating mode of the processor, an internal processor system bus that interconnects the processor to the memory component block and the mode switch unit, and a power controller that issues a power control signal to the processor in order to initiate a power-up routine and a power-down routine.

According to the disclosed embodiment, the a/b interface component block comprises a converter component block and a subscriber line interface. The converter component block converts digital data received from the ISDN telecommunications network to analog data, and converts analog data to be transmitted to the ISDN telecommunications network to digital data. The subscriber line interface performs classical BORSCHT functions.

According to another object of the present invention, a network termination unit is disclosed for connecting a terminal device to a U interface of an ISDN telecommunications network, comprising means for suppressing an echo signal at the U interface of the ISDN telecommunications network, an interface adapter to which the terminal device is connected to enable an exchange of data between the ISDN telecommunications network and the terminal device, and a processor system for controlling operations of the echo signal suppressing means and the interface adapter. The interface adapter comprises a converter and a subscriber line interface. The converter converts digital data received from the ISDN telecommunications network to analog data, and converts analog data to be transmitted to the ISDN telecommunications network to digital data, while the subscriber line interface performs classical BORSCHT functions.

The network termination unit of the present invention enables a plurality of analog terminals and digital terminals, such as, for example, two analog terminals and six digital terminals, to be connected to one U interface of the ISDN. Further, a plurality of terminals, such as, for example, two terminals of the eight terminals (mentioned above) can be simultaneously operated.

The present disclosure relates to subject matter contained in Swiss patent application No. 00 247/94-3 (filed on Jan. 27, 1994), which is expressly incorporated herein by reference in its entirety.

BRIEF DESCRIPTION OF THE DRAWINGS

The foregoing and other objects, features and advantages of the invention will be apparent from the following more particular description of the preferred embodiment, as illustrated in the accompanying drawings, in which reference characters refer to the same parts throughout the various views, and wherein.

DESCRIPTION OF THE PREFERRED EMBODIMENT

Figure 1:
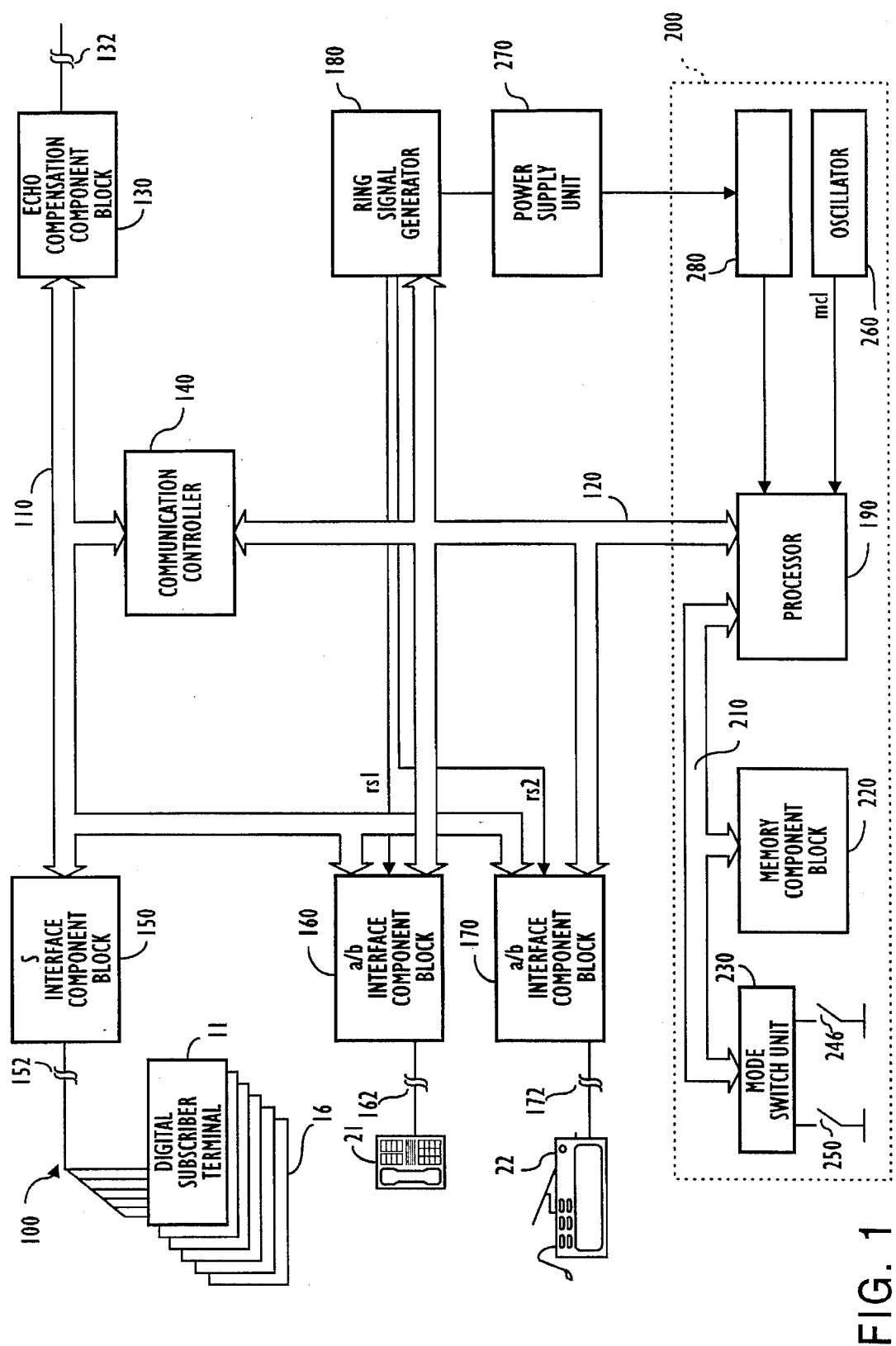
FIG. 1 illustrates a block circuit diagram of a network termination unit according to the present invention.

FIG. 1 illustrates a network termination unit 100 constructed according to the present invention. The network termination unit 100 has a first bus 110 for exchanging voice and data information (over two base [B] channels and a single data [D] channel), and a processor bus (second bus system) 120. In the illustrated embodiment, two analog subscriber terminals 21, 22 and six digital subscriber terminals 11, . . . , 16 are connected to a central exchange (not illustrated) via a U interface 132 of the ISDN using the network termination unit 100. However, it is noted that the present invention is not limited to two analog subscriber terminals and/or six digital subscriber terminals.

An echo compensation component block (U interface component) 130 is connected to a communication controller 140 and an S interface component block 150 by the first bus system 110.

Echo is the feedback of a transmitted signal to a receiver, and primarily occurs from the local attachment of a transmitter-receiver of the terminal device to a two-wire local loop. The technique used to overcome this problem is referred to as echo cancellation (or echo compensation). A replica of the echo signal is generated by the echo compensation component block 130 at the transmitting end and is subtracted from the incoming signal, effectively cancelling the echo.

The echo compensation component block 130 is disc connected to the U interface 132 of the ISDN. Two a/b interface component blocks 160 and 170 are interconnected to the echo compensation component block 130, the communication controller 140 and the S interface component block 150 by the first bus system 110. The S interface component block 150 is connected, via an S interface 152 of the ISDN, with the digital terminals 11, . . . , 16, while the a/b interface component blocks 160 and 0 are each connected to a respective analog terminal 21 and 22 via respective a/b interfaces 162 and 172.

Commercially available components can be used for the echo compensation component block 130 and the S interface component block 150. For example, item number PEB 2091, produced by Siemens Corporation, can be employed for the echo compensation component block 130, while item number PEB 2081, produced by Siemens Corporation, can be employed for the S interface component block 150. However, other devices can be substituted without departing from the scope and spirit of the instant invention.

In the illustrated embodiment, terminal 22 comprises a facsimile machine. The second bus 120 interconnects the communication controller 140, a ring signal generator 180 that produces a ring signal for an appropriate terminal, the a/b interface component blocks 160 and 170, and a processor 190 of a processor system 200. An internal processor system bus 210 of the processor system 200 interconnects together the processor 190, a memory component block 220 that stores operating parameters, and a mode switch unit 230. The mode switch unit 230 functions to set a mode of the processor 190, in accordance with the setting of switches 240 and 250.

An oscillator 260 is connected to the processor 190 to provide a clock (timing) signal. The processor 190 is also connected to a power supply unit 270 that supplies electrical power to the processor system 200 via a power-up controller 280.

The power-up controller 280 determines the status of the supply voltage from the power supply unit 270 and provides an appropriate supply voltage status signal (power control signal) to the processor 190, so that requisite power-up and power-down routines can be performed at proper times. For example, during an emergency operation, such as would exist if the local power supply fails, it is necessary to sharply reduce the current consumption of the circuit arrangement (in this case, power is supplied through the central exchange). In such a situation, the processor can be programmed to issue a calling signal selecting one of the analog or digital terminals 11, . . . , 16 or 21 or 22 to operate, while the remaining (e.g., non-selected) terminals would be placed into a power-down sleep mode in which a terminal draws a minimal electrical power consumption. Alternatively, the processor 190 can be programmed to change only those terminals that are required from the power-down mode to an operational ready mode.

The power consumption can also be reduced, regardless of the selected operating mode, if, for example, two analog terminals 21 and 22 are required to operate simultaneously, by outputting calling signals in alternation to the respective a/b interface component blocks 160 and 170.

The echo compensation component block 130 is connected to the central exchange via the U interface 132 using a two-wire line, thus enabling the transmission of data using a duplex channel method, such as disclosed at page 105 and FIG. 6.15 of Kommunikation mit ISDN [Communications Using the ISDN] by Dr. H. E. Martin, published by Markt & Technik Verlag, Munich, 1988. The transmitted data is in accordance with the standard assigned to one of two digital speech channels (B channels) and one digital signaling channel (D channel) of the ISDN. The signaling data transmitted over the D channel is transferred by the communication controller 140 to the processor 190 for evaluation. The communication controller 140 realizes the D channel connecting function, or is intended for the implementation of the D channel protocol.

Model number PEB 2070 communication controller, manufactured by Siemens Corporation, is an example of an ISDN communication controller 140. However, it is understood that substitutions can be made without departing from the spirit or scope of the instant invention.

Processor 190 also communicates, via the communication controller 140 and the first bus 110, with the echo compensation component block 130 and the S interface component block 150, which are programmed by the processor 190 in accordance with present configuration data. Moreover, the B channels are switched through either the S interface component block 150 or the a/b interface component blocks 160 and 170 by the communication controller 140, which is controlled by the processor 190.

If both B channels are already busy, because they are, for example, occupied by the S interface component block 150, no dial tone can be switched through to the a/b interface component blocks 160 and 170. In such an event, an internally generated "all trunks busy" tone (such as, for example, a 425 Hz signal) is applied to one or both of the a/b interface component blocks 160 and 170. Preferably, interrupt signals are outputted to the communication controller 140 by the processor 190, with, for example, an 8 kHz cadence, according to which, upon each interrupt, one sampling value of the "all trunks busy" tone is output via the first bus 110 to the a/b interface component blocks 160 and 170. In this way, additional tones (such as, for example, the ringing tone) can be output to the a/b interface component blocks 160 and 170.

Various signals, such as the "all trunks busy" tone, metering pulses (charge/call units that are used for billing purposes and which are transmitted over lines rs1 and rs2, to be discussed below) or other signals can, in principle, be arbitrarily generated, by an executed software program or by dividing the provided reference frequency (clock) signal 260.

The construction of the a/b interface component block 160 is similar to the construction of the a/b interface component block 170. Thus, a detailed description of only one a/b interface component block will be described.

Figure 2:
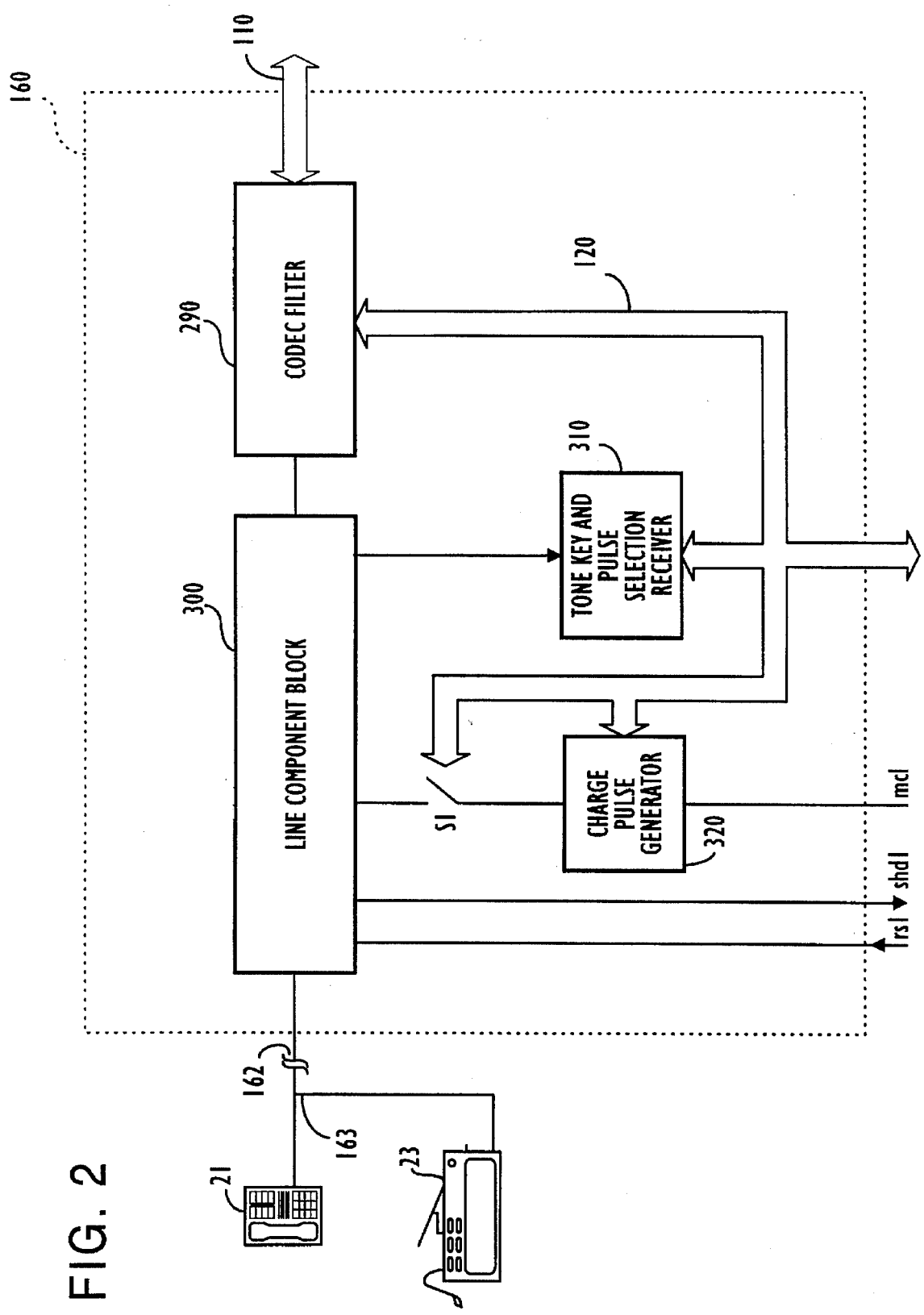
FIG. 2 illustrates an a/b interface component block of the network termination unit of FIG. 1, in which the a/b interface component block is connected to an analog terminal.

The a/b interface component block 160 is illustrated in greater detail in FIG. 2. The a/b interface component block 160 is connected to analog terminal 21. Optionally, an adapter 163 is provided to enable a further terminal 23 (such as, for example, a facsimile machine) to be connected in parallel with the analog terminal 21. The a/b interface component block 160 comprises a converter component block (CODEC filter) 290 that is connected to the first bus 110 and to terminal 21 via a subscriber line interface 300 and the a/b interface 162.

The CODEC filter 290 functions as a digital/analog converter with respect to data transmitted to the analog terminal 21, and functions as an analog/digital converter with respect to data transmitted to the ISDN.

The subscriber line interface 300 is also connected to the ring signal generator 180, via the fee charge line rs1 (fee charge line rs2 with respect to a/b interface component block 170), and a dual tone multi-frequency and pulse dialing receiver 310. A metering pulse generator 320, which receives the reference frequency signal (clock signal) mc1 from the oscillator 260 of the processor system 200, is connected to the line component block 300 via switch S1. Switch S1 is operated by commands issued over the second bus 120. The metering pulse generator 320, the ring signal generator 180 and the dual tone multi-frequency and pulse dialing receiver 310 are coupled to the processor 190 of the processor system 200 via the second (processor) bus 120 to control the operation of the a/b interface component block and to enable data communications. A dividing ratio of the charge pulse generator 320 is defined by the processor 190. A frequency f1 (of, for example, 12 kHz) for the metering pulses is generated by a suitable division of the reference frequency signal (clock signal) mc1 supplied by the oscillator 260. It is noted that the metering pulses may also be generated by the execution of a software program, instead of using electronic hardware.

Upon the actuation of switch S1, corresponding signals are supplied to the subscriber line interface 300. Selection signals generated by terminal 21 are supplied to the processor 190 over the second (processor) bus 120 via the dual tone multi-frequency and pulse dialing receiver 310. In the illustrated embodiment, the dual tone multi-frequency and pulse dialing receiver 310 is implemented using electronic hardware. However, it is noted that the dual tone multi-frequency and pulse dialing receiver 310 can be implemented in software, without departing from the scope or spirit of the instant invention. The connecting configuration is accomplished, if a free B channel is available, in cooperation with the processor 190 of the processor system 200 and the communication controller 140. Instructions can be transmitted to the processor 190 by analog terminal 21 or 22 if the analog terminal 21 or 22 has special keypad keys available, such as, for example, the "#" (pound) key and/or the "*" (star) key. For example, telephone numbers of the a/b interfaces, terminal type information with HLC (High Layer Compatibility) information, and desired emergency operation mode information (i.e., whether the terminal should operate via the a/b interface or the S interface during an emergency operation, or whether the terminal should not operate during the emergency operation) can be supplied to the processor 190, or sequences to test the operation of the system can be called up and performed.

In the illustrated embodiment, the line component block 300 comprises a commercially available integrated circuit, such as, for example, item number HC-5502A sold by Harris Semiconductor. Similarly, the CODEC filter 290 comprises a commercially available integrated circuit, such as item number PEB 2060 sold by Siemens Corporation. However, it is understood that equivalent devices (or circuitry) from other manufacturers may be substituted for the above-described integrated circuits, without departing from the scope or spirit of the instant invention. It is noted that pages 25–29 and FIGS. 2 and 3 of Bauteile—Technologie im System ALBIS-ECS 10 000 [Component Technology in the ALBIS-ECS 10 000 System] by Samuel Hämmerli, published by Siemens-ALBIS- Berichte [Siemens-ALBIS Reports] 40 (1988), No. ½, describe acceptable substitutes for the subscriber line interface 300 and the converter component block (CODEC filter) 290. Further, it is noted that the line component block 300 is preferably embodied discretely if it is desired to reduce the electrical power consumption.

The subscriber line interface 300 performs classical BOR-SCHT functions (such as, for example, battery feed, overvoltage protection, ringing signalling coding, hybrid, and testing), with the exception of the analog/digital conversion (coding) which is carried out in the codec filter 290. The loop monitoring function, mentioned above, causes an answering signal (switch hook detection signal) shed to be output from the subscriber line interface 300 to the processor 190 when a handset of a terminal goes off-hook (such as occurs, for example, when a user removes the handset of the terminal from its cradle). In the embodiment illustrated in FIG. 2, the answering signal (switch hook detection signal) shd1 is output over a separate line. However, the answering signal (switch hook detection signal) shd1 can be outputted from the subscriber line interface 300 to the processor 190 over the second (processor) by 120 without departing from the scope or spirit of the instant invention.

The subscriber line interface 300 follows the converter component block (CODEC filter) 290, which serves the purpose of converting the analog subscriber signal to a PCM digital signal, and to convert the PCM digital signal to an analog subscriber signal. The converter component block (CODEC filter) 290 also operates to define and filter the bandwidth of the network. In the illustrated embodiment, the frequency response, impedance and amplification/attenuation characteristics of the converter component block 290 are programmed by means of the processor 190.

The first bus 110 comprises a one bit clock line, a one frame clock line, and two data lines, each of which is provided for data communication in one direction. A bus interface, which is familiar to one skilled in the art, is described, for example, at pages 260–266 of ISDN—Die Technik [ISDN—The Technology] by A. Kanbach and A. Körper, published by Hüthig Verlag, Heidelberg, 1990. Bus interface (IOM version 2), which arose as a further development of the bus—(1)—interface is preferably used. It is especially advantageous with this interface that information from the components connected to the first bus 110 can be exchanged with one another without having to occupy the B channels of the ISDN.

A known D-channel access control, such as described at pages 105–109 of ISDN—Die Technik [ISDN—The Technology] by A. Kanbach and A. Körper, published by Hüthig Verlag, Heidelberg, 1990, is utilized in order to prevent collisions on the D channel of the ISDN that can occur when digital terminals 11, . . . , 16 simultaneously initialize a connecting configuration.

The following provisions are contemplated in order to avoid collisions on the D-channel of the ISDN that would occur in the event digital terminals 11, . . . , 16 and analog terminals 21, 22, (or, optionally, parallel connected terminal 23) simultaneously initialize a seizure. In principle, only one terminal at a time can access the D channel of the ISDN. This is achieved by means of a collision detection scheme used for each terminal; this detection scheme is enabled by reflecting the transmitted signaling data in an echo channel.

To avoid collisions in a connecting configuration for an analog terminal, the S interface component block 150 monitors the data arriving over the D channel. When a D channel request (request for access permission) signal arrives from the communication controller 140, the S interface component block 150 gives authorization to access the D channel, as long as it is not itself using the D channel. At the same time, the S interface component block 150 prevents all the digital terminals 11, . . . , 16 from accessing the D channel. This is done by setting an E (echo) channel to zero. The communication controller 140 is therefore capable of outputting a HDLC (High-level Data Link Control) frame to the D channel (in accordance with a HDLC protocol) without causing a collision. The HDLC protocol comprises a bit-oriented, synchronous protocol, developed by the International Organization for Standardization (ISO), in which messages are transmitted in units (frames), each frame of which can contain a variable amount of data, but which must be organized in a particular way. Because of the signaling data output by the communication controller 140, a connecting configuration for the analog terminals is made possible, as described, for example, at pages 73–75 of ISDN—Die Technik [ISDN—The Technology] by A. Kanbach and A. Körper, published by Hüthig Verlag, Heidelberg, 1990.

We claim:

1. A network termination unit for connecting a terminal device to a U interface of an ISDN telecommunications network, comprising:

a processor system;

an echo compensator connected to the U interface of the ISDN telecommunications network;

a communication controller;

an a/b interface component block connected to an a/b interface of the ISDN telecommunications network, said a/b interface component block comprising:
  a subscriber line interface; and
  a converter component block;

an S interface component block connected to an S interface of the ISDN telecommunications network; and a first bus that inter-connects said echo compensator, said communication controller, said a/b interface component block, and said S interface component block, said processor system having access to said first bus via a second bus that inter-connects said processor system, said communications network and said a/b interface component block to enable the terminal device to transmit and receive data over the ISDN telecommunications network.

2. The network termination unit of claim 1, wherein B channels of the ISDN telecommunications network are controlled by said a/b interface component block, and said processor system evaluates and prepares D channel signalling data for said a/b interface component block.

3. The network termination unit of claim 1, wherein said processor system transmits signaling data to a D channel of the ISDN telecommunications network.

4. The network termination unit of claim 1, wherein said communication controller is controlled by said processor system to output predetermined digitalized tones via said first bus to said a/b interface component block.

5. The network termination unit of claim 4, wherein said predetermined digitized tones comprise a first digitized tone representing an "all trunks busy" tone and a second digitized tone representing a ringing tone.

6. The network termination unit of claim 1, wherein said processor system programs at least one of said S interface component block and said converter component block.

7. The network termination unit of claim 1, wherein said a/b interface component block further comprises a metering pulse generator controlled by said processor system, a reference frequency signal being inputted to said metering pulse generator, said inputted reference frequency signal being divided in said metering pulse generator in accordance with instructions of said processor system to produce a desired frequency signal that is outputted to said subscriber line interface in response to a command from said processor system.

8. The network termination unit of claim 1, further comprising a ring signal generator controlled by said processor system, said ring signal generator being connected to said subscriber line interface of said a/b interface component block via a predetermined line, said ring signal generator outputting a signal on said predetermined line.

9. The network termination unit of claim 8, wherein said processor system is connected to said subscriber line interface via a second predetermined line to transmit a switch hook detection signal generated by said subscriber line interface to said processor system.

10. The network termination unit of claim 8, wherein said processor outputs a power control signal to at least one of said a/b interface component block, said ring signal generator, and said S interface component block.

11. The network termination unit of claim 1, wherein said processor system is connected to said subscriber line interface via a predetermined line to transmit a switch hook detection signal generated by said subscriber line interface to said processor system.

12. The network termination unit of claim 1, wherein said processor system comprises:
  a processor;
  a memory component block; and
  a mode switch unit.

13. The network termination unit of claim 12, further comprising an internal processor system bus that interconnects said processor, said memory component block and said mode switch unit.

14. The network termination unit of claim 1, wherein said communication controller and said S interface component block are programmed such that said communication controller outputs signals to a D channel of the ISDN telecommunications network only in the event that an authorization request from said communication controller is affirmatively answered by said S interface component block.

15. The network termination unit of claim 1, wherein said terminal device comprises an analog terminal.

16. The network termination unit of claim 1, further comprising a power controller to reduce current consumption during an emergency situation.

17. The network termination unit of claim 1, further comprising a power controller controlling said processor to selectively initiate one of a power up routine and a power down routine for the terminal device.

18. A network termination unit for connecting an analog terminal device or a digital terminal device to a U interface of an ISDN telecommunications network, comprising:
  a processor system, comprising:
    a processor;
    an oscillator that supplies a reference frequency clock signal to said processor;
    a memory component block that stores operating parameters;
    a mode switch unit that sets an operating mode of said processor;
    an internal processor system bus that interconnects said processor, said memory component block and said mode switch unit; and
    a power controller that issues a power control signal to said processor to initiate a power-up routine and a power-down routine;
  means for compensating for an echo at the U interface of the ISDN telecommunications network;
  an a/b interface component block for connecting an analog terminal device to the ISDN telecommunications network;
  an S interface component block for connecting a digital terminal device to the ISDN telecommunications network;
  means for exchanging data between said compensating means, said a/b interface component block, and said S interface component block; and
  means for exchanging operating instructions between said processor system and said a/b interface component block.

19. The network termination unit of claim 18, wherein said a/b interface component block comprises:
  a converter component block that converts digital data received from the ISDN telecommunications network to analog data, and converts analog data to be transmitted to the ISDN telecommunications network to digital data; and a subscriber line interface that performs classical BORSCHT functions, said subscriber line interface being interconnected to said converter component block.

20. The network termination block of claim 18, further comprising means for connecting a plurality of analog terminal devices to said a/b interface component block.

21. The network termination unit of claim 18, said power controller to reduce current consumption during an emergency situation.

22. The network termination unit of claim 18, said power controller controlling said processor to selectively initiate one of a power up routine and a power down routine for the terminal device.

23. A network termination unit for connecting a terminal device to a U interface of an ISDN telecommunications network, comprising:

means for suppressing an echo signal at the U interface of the ISDN telecommunications network;

an interface adapter to which the terminal device is connected to enable an exchange of data between the ISDN telecommunications network and the terminal device; and a processor system for controlling operations of said echo signal suppressing means and said interface adapter.

24. The network termination unit of claim 23, wherein said interface adapter comprises:

a converter that converts digital data received from the ISDN telecommunications network to analog data, said converter also operating to convert analog data to be transmitted to the ISDN telecommunications network to digital data; and a subscriber line interface that performs classical BORSCHT functions, said subscriber line interface being interconnected to said converter component block.

25. The network termination unit of claim 23, further comprising means for reducing current consumption during an emergency situation.

26. The network termination unit of claim 23, further comprising means for controlling said processor to selectively initiate one of a power up routine and a power down routine for the terminal device.

* * * * *